(12) United States Patent  (10) Patent No.: US 7,525,226 B2
Kodama  (45) Date of Patent: Apr. 28, 2009

(54) DYNAMIC PRESSURE BEARING AND MOTOR USING THE SAME

(75) Inventor: Mitsuo Kodama, Fujieda (JP)

(73) Assignee: Victor Company of Japan, Limited, Yokohama-shi (JP)

( * ) Notice: Subject to any disclaimer, the term of this patent is extended or adjusted under 35 U.S.C. 154(b) by 463 days.

(21) Appl. No.: 11/340,461

(22) Filed: Jan. 27, 2006

(65) Prior Publication Data

US 2006/0171615 A1     Aug. 3, 2006

(30) Foreign Application Priority Data

Jan. 28, 2005  (JP)  ............... P2005-020867
Oct. 27, 2005  (JP)  ............... P2005-312402

(51) Int. Cl.
     *H02K 5/12*  (2006.01)
(52) U.S. Cl. ........................ 310/90; 384/114
(58) Field of Classification Search ............. 310/90, 310/67 R; 384/100, 107, 114, 115, 291, 384/292, 120
     See application file for complete search history.

(56) References Cited

U.S. PATENT DOCUMENTS 5,415,476 A * 5/1995 Onishi ................... 384/114
7,005,768 B2 * 2/2006 Tamaoka et al. ......... 310/90
7,133,250 B2 * 11/2006 Herndon et al. ........ 360/99.08

FOREIGN PATENT DOCUMENTS

JP          11-82479          3/1999

* cited by examiner

*Primary Examiner*—Dang D Le
(74) *Attorney, Agent, or Firm*—The Nath Law Group; Jerald L. Meyer; Sungyeop Chung

(57) ABSTRACT

One preferred embodiment of the present invention provides a dynamic pressure bearing formed of a porous material into a shape of a cylindrical sleeve, for rotatably supporting a shaft inserted thereinto, including a first groove portion being formed circumferentially in a part of the inner circumferential surface of the dynamic pressure bearing; a second groove portion being formed circumferentially in the inner circumferential surface of the dynamic pressure bearing so as to have an intervening portion of the inner circumferential surface of the dynamic pressure bearing interposed between the first groove portion and the second groove portion; and a connection groove formed in the intervening portion so as to link the first groove portion and the second groove portion, the connection groove having at a bottom surface thereof a porous open ratio lower than a porous open ratio at any portion except for the bottom surface in the intervening portion.

3 Claims, 7 Drawing Sheets

WHITE : SOLID  BLACK : PORE

DYNAMIC PRESSURE BEARING AND MOTOR USING THE SAME

BACKGROUND OF THE INVENTION

1. Field of the Invention

The present invention relates to a dynamic pressure bearing, specifically a sintered alloy dynamic pressure fluid bearing, and a motor using the same.

2. Description of the Related Art

In a disc reading and writing apparatus, a motor equipped with a dynamic pressure fluid bearing has become in general use as a disc driving motor, because of its high reliability and longevity.

In addition, a radial dynamic pressure fluid bearing made of a sintered alloy, instead of copper alloy that used to be a mainstream material for such a bearing, has now come to frequent use. This is because a sintered material is porous so that it can retain a relatively large amount of lubrication oil therewithin, thereby extending the service life of the bearing. Such a dynamic pressure fluid bearing made of a sintered material has been disclosed in Japanese Patent Application Laid-open Publication No. H11-82479.

In a radial dynamic pressure fluid bearing (referred to as a sleeve, as the case may be, hereinafter) into which a shaft is inserted to be rotatable, a groove, typically a herringbone groove, for generating dynamic pressure is formed in the inner circumferential surface of the sleeve. When the shaft rotates, lubrication oil kept between the shaft and the sleeve flows along the groove toward the apex portion of the groove to increase a pressure of the oil in and around the apex portion, thereby enabling the shaft to be contactlessly supported by the sleeve.

In such a bearing, there are generally provided two herringbone groove portions that are apart with each other along an axis direction in order to support the shaft contactlessly in two positions, thereby preventing the shaft from wobbling as much as possible.

However, when the sleeve is made of a porous material such as a sintered alloy, since the porous material has a countless number of pores, by which the material is referred to as porous, the lubrication oil permeates into the sleeve through the pores and flows therethrough out to somewhere between the grooves where an oil pressure remains lower even when the shaft is rotating.

Therefore, a dynamic pressure of the lubrication oil in the grooves cannot be higher than expected, or is saturated to a certain pressure, at the time of rotation.

Consequently, a shaft supporting capability of the bearing is impaired, which may allow the shaft to yield to a load applied from outside into inclination, resulting in reduced shaft rigidity.

If this takes place, the shaft tends to contact the sleeve and thus be damaged, thereby shortening the service life of the bearing. In addition, a disc reading and writing apparatus employing such a bearing suffers from NRRO (Non Repeatable Run-Out), thereby increasing an occurrence rate of a reading or writing error.

As measures against such a disadvantage of lubrication oil sweeping away through pores in the apex portion of the dynamic pressure groove, the above publication discloses a groove that is similar to the herringbone groove but does not have the apex portion where an oil pressure has to become higher, as illustrated in FIG. 1. According to this type of groove, the lubrication oil is prevented from flowing along a dotted arrow F in FIG. 1 because of a flat portion Mc that eliminates the apex portion in the herringbone groove.

However, in a sleeve 101 having two (a pair of) herringbone groove portions M1, M2 provided apart along an axis direction, since there are no apex portions in the groove portions M1, M2 by the flat portion Mc, the inner diameter d1 of the flat portion Mc has to be smallest in order to generate higher dynamic pressure.

Therefore, the hole having the inner diameter d1 has to be undercut when the bearing having such herringbone grooves is fabricated by press-molding or by plastic forming with a tool, in which a mold or a tool is moved along the inner surface and then removed.

As a result, the mold or the tool tends to have a complicated structure, thereby increasing facility costs.

In addition, when the sleeve is made by plastic forming with a tool, the pair of grooves cannot be made continuously, which is somewhat disadvantageous in that one groove is slightly different in size from the other one of the pair, or their dimensions tend to vary. Namely, it is very difficult to make the grooves of the dynamic pressure bearing with precision, without variation.

On the other hand, the groove M1 can be made in one sleeve and the groove M2 can be made in another sleeve, both of which are then jointed to be in use as a bearing. However, this construction needs a highly precise axial alignment and an increased number of processes, leading to an increased production cost, which makes this construction unfavorable.

The present invention has been made in view of the above disadvantages, and the objective thereof is a low-cost provision of a dynamic pressure bearing and a motor using the same that can generate high dynamic pressure to realize high shaft rigidity and reliability, and the long service life.

SUMMARY OF THE INVENTION

In order to achieve the above objective, a first aspect of the present invention provides a dynamic pressure bearing (10) formed of a porous material into a shape of a cylindrical sleeve (10), for rotatably supporting a shaft (2s) inserted thereinto, comprising a first groove portion (17a) being formed circumferentially in a part of the inner circumferential surface (10a) of the dynamic pressure bearing (10), a second groove portion (17b) being formed circumferentially in the inner circumferential surface (10a) so as to have an intervening portion (17c) on the inner circumferential surface (10a) interposed between the first groove portion (17a) and the second groove portion (17b), and a connection groove (17c1, 17c2, 17c3) being formed in the intervening portion (17c) so as to link the first groove portion (17a) and the second groove portion (17b), the connection groove (17c1, 17c2, 17c3) having at a bottom surface thereof a lower porous open ratio (Mk) than a porous open ratio (Ik) at any portion except for the bottom surface in the intervening portion (17c).

A second aspect of the present invention provides a motor (M) comprising a stator (S); a rotor (R) including a shaft (2s) having in part a small diameter portion (2s2); and a dynamic pressure bearing (10) formed of a porous material into a shape of a cylindrical sleeve (10), the dynamic pressure bearing (10) supporting the shaft (2s) inserted thereinto rotatably in relation to the stator (S). In this motor (M), a first groove portion (17a) is formed circumferentially in the inner circumferential surface (10a) of the dynamic pressure bearing (10), the first groove portion (17a) being adjacent to one end of a circumferential region (17c) including at least a range opposing the small diameter portion (2s2) of the shaft (2s) inserted into the dynamic pressure bearing (10); a second groove portion (17b) is formed circumferentially in the inner circumferential surface (10a) of the dynamic pressure bearing (10), the second groove portion (17b) being adjacent to the other end of the circumferential region (17c); and wherein a connection groove (17c1, 17c2, 17c3) linking the first groove portion (17a) and the second groove portion (17b) is provided in the circumferential region (17c), the connection groove (17c1, 17c2, 17c3) having at a bottom surface thereof a lower porous open ratio (Mk) than a porous open ratio (Ik) at any portion except for the bottom surface in the circumferential region (17c).

A third aspect of the present invention provides a motor according to the second aspect, wherein an average open ratio β defined as [M×Mk+(1−M)×Ik] is 0.37 or less, where M is a ratio of an apparent area of the connection groove (17c1, 17c2, 17c3) with respect to the total area of the circumferential region (17c), Mk is a ratio of an area of pores in the porous material at the bottom surface of the connection groove (17c1, 17c2, 17c3) with respect to the total area of the bottom surface, and Ik is a ratio of an area of pores at any portion except for the bottom surface in the circumferential region (17c1, 17c2, 17c3) with respect to the total area of the region (17c1, 17c2, 17c3).

According to the present invention, there is provided a dynamic pressure bearing having high shaft rigidity, high reliability, and long service life while preventing a production cost from increasing and a motor using the same.

DESCRIPTION OF THE PREFERRED EMBODIMENTS

Referring to FIGS. 2 to 10, preferred embodiments of the present invention will be described in detail hereinafter.

Figure 1:
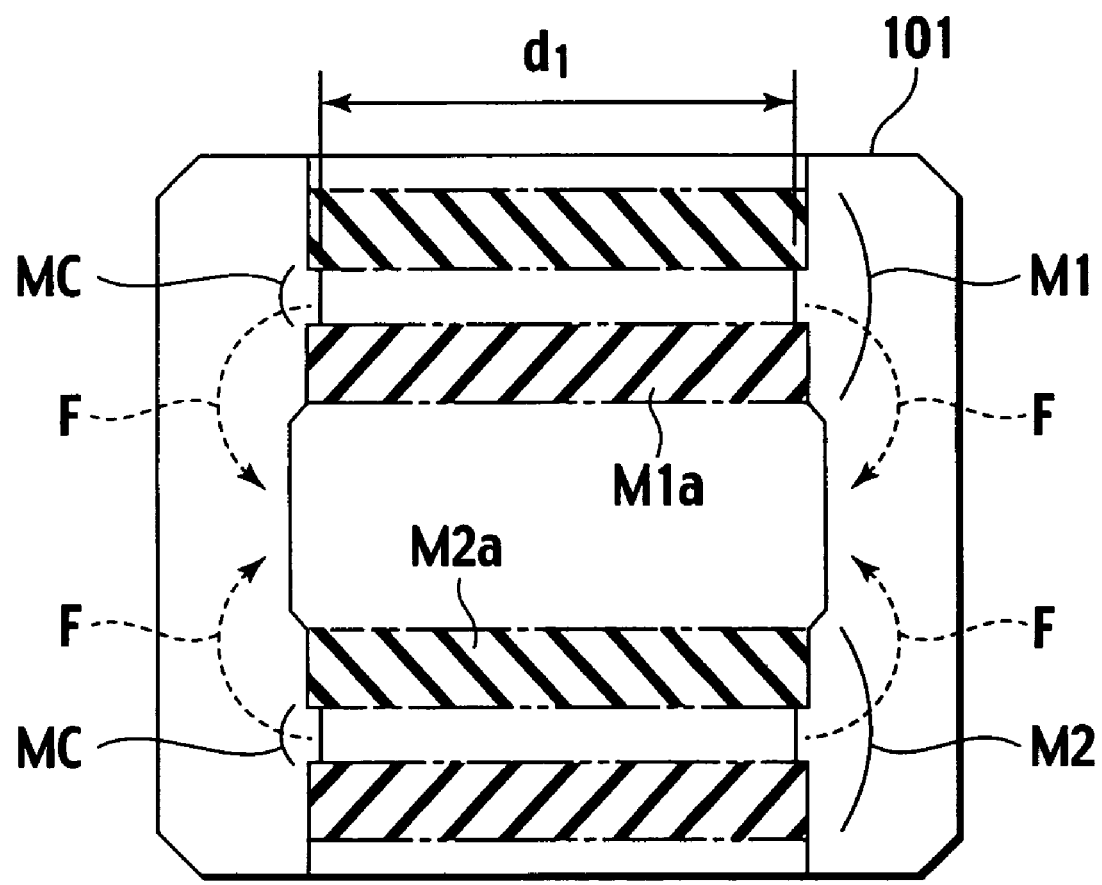
FIG. 1 is an explanatory view of a related art sintered alloy dynamic pressure bearing.
Figure 2:
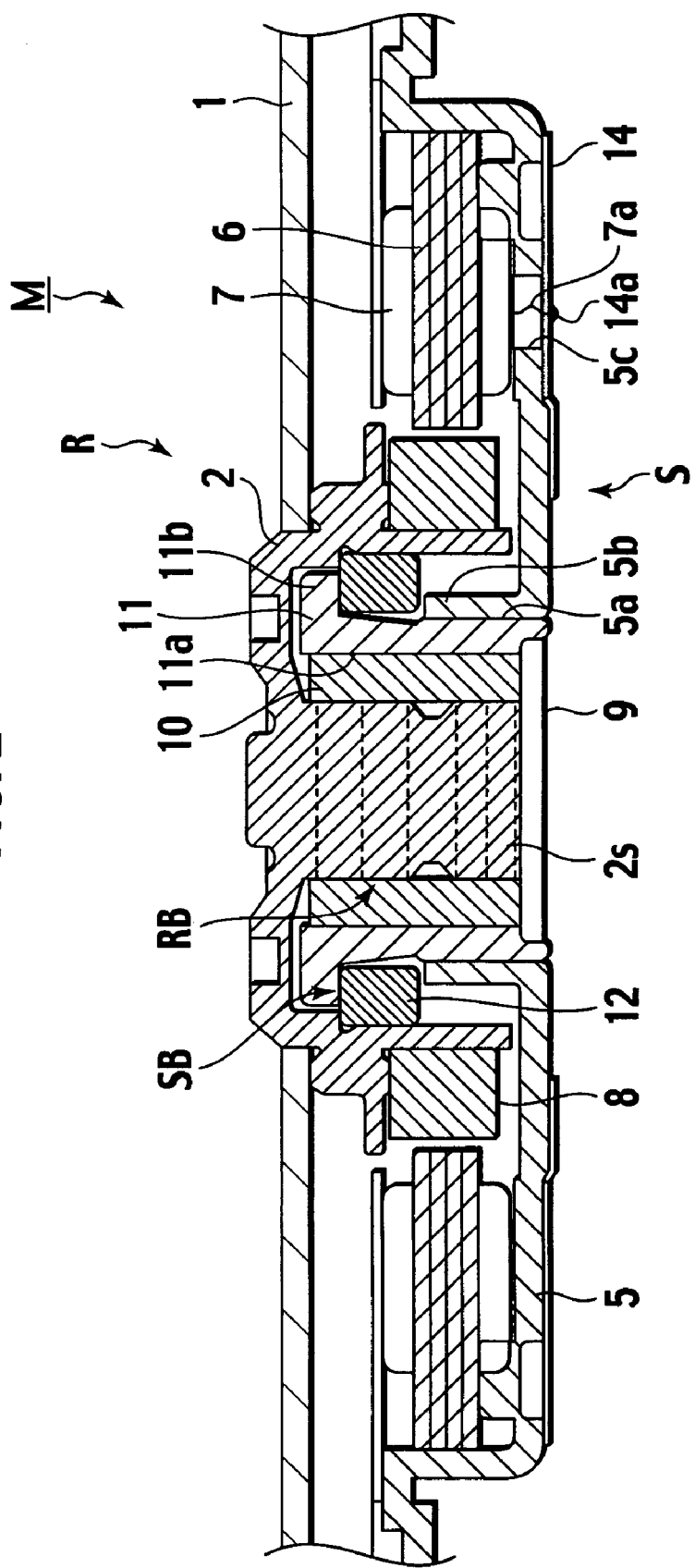
FIG. 2 is a cross-sectional view of a motor according to an embodiment of the present invention.

As a motor having a sintered alloy dynamic pressure bearing according to one preferred embodiment of the present invention, a disc driving motor for use in a hard disc drive (HDD) will be described in detail referring to FIG. 2.

A motor M is comprised of a rotor R having a hub 2 formed integrally with a cylindrical shaft portion 2s, and a stator S having a motor base 5 and a sintered alloy dynamic bearing (sleeve) 10. The rotor R is supported by a thrust dynamic bearing portion SB and a radial dynamic pressure bearing portion RB (referred to as dynamic pressure bearing B, as the case may be, hereinafter), being rotatably relative to the stator S. The motor can operate at a rotation speed of 3600 rotations per minute (rpm). Into the hub 2 is fitted firmly a read/write disc (hard disc) 1.

First of all, the stator S will be described in detail. The stator S has the motor base 5, a cylindrical housing 11 secured on the motor base 5, the sleeve 10 secured on the housing 11, and a core 6. The core 6 is annular shaped and has a plurality of protruding poles (not shown) that protrude inwardly toward the center of the core 6 and have a coil 7 wound therearound. The core 6 is made by stacking thin silicon steel plates and has an insulation coating thereon by electrophoretic coating or powder coating.

A lead 7a at one end of the coil 7 goes through a through hole 5c provided in the motor base 5 and is soldered onto a land 14a of a flexible print circuit board (referred to as FPC, hereinafter) 14 attached on the bottom surface of the motor base 5. The land 14a is electrically connected to a motor drive circuit (not shown) of the HDD via a circuit pattern (not shown) formed on the FPC 14. The motor drive circuit provides electric current to each phase of the coil 7, thereby rotating the rotor R.

The motor base 5 is made by aluminum die-casting or by press-processing an aluminum plate or an iron plate. When the motor base 5 is made of an iron plate, the surface thereof is electroplated by Nickel. In addition, the motor base 5 is provided with a cylindrical upright portion 5b that defines a through hole 5a at the center thereof.

The housing 11 is firmly and precisely attached to the motor base 5 by an adhesive in a way that the outer circumferential surface of the housing 11 is fitted with the inner circumferential surface of the upright portion 5b. The housing 11 is provided with a through hole 11a to which the sleeve 10 is secured (described later) and a flange portion 11b that is formed at one end thereof to protrude annularly outward in a radial direction. In addition, at the other end of the housing 11 is sealed with a counter plate 9. The housing 11 is made of a copper alloy such as C3602 or the like, or a stainless steel. To the through hole 11a of the housing 11 is secured the sleeve 11 which is formed of a sintered alloy obtained by sintering iron and copper, or a mixture of iron and copper into a shape of cylinder.

Next, the rotor R will be described in detail. The rotor R is composed of a hub 2 that takes substantially a shape of a cup and has a cylinder solid shaft portion 2s at the center thereof, an annular shaped magnet 8 secured on the outer circumferential surface of the hub 2, and a thrust ring 12 secured on the inner circumferential surface of the hub 2. The hub 2 is formed of martensite, ferrite, or austenite stainless steel. The hub 2 constitutes a magnet circuit along with the core 6 and the magnet 8.

In addition, the hub 2 is subjected to a surface treatment such as but not limited to electroless nickel plating for the purpose of increased abrasion resistance and therefore the surface thereof is coated with Nickel of about 3 to 50 micrometers thick. The magnet 8 is formed of a sintered material whose surface is treated by electrodeposition coating. On the outer circumferential surface thereof, there is formed twelve magnetic poles. The magnet 8 is adhered on the outer circumferential surface of the hub 2.

The thrust ring 12 is made of a stainless steel and adhered on the inner circumferential surface of the hub 2.

Next, regarding the dynamic pressure bearing portion B, there will be described the radial dynamic pressure bearing portion RB, the thrust dynamic pressure bearing portion SB, and a lubrication oil filled path in this order, referring to FIG. 3.

<Radial Dynamic Pressure Bearing Portion RB>

The radial dynamic pressure bearing portion RB is defined by an inner circumferential surface 10a of the sleeve 10 fitted firmly into the through hole 11a of the housing 11, an outer circumferential surface 2s1 of the shaft portion 2s, and lubrication fluid 30 filled in a gap between the two surfaces 10a, 2s1. The lubrication fluid 30 is referred to as lubrication oil 30 in the following description. However, the lubrication fluid 30 is not necessarily limited to the lubrication oil as far as it is in liquid state.

Figure 4:
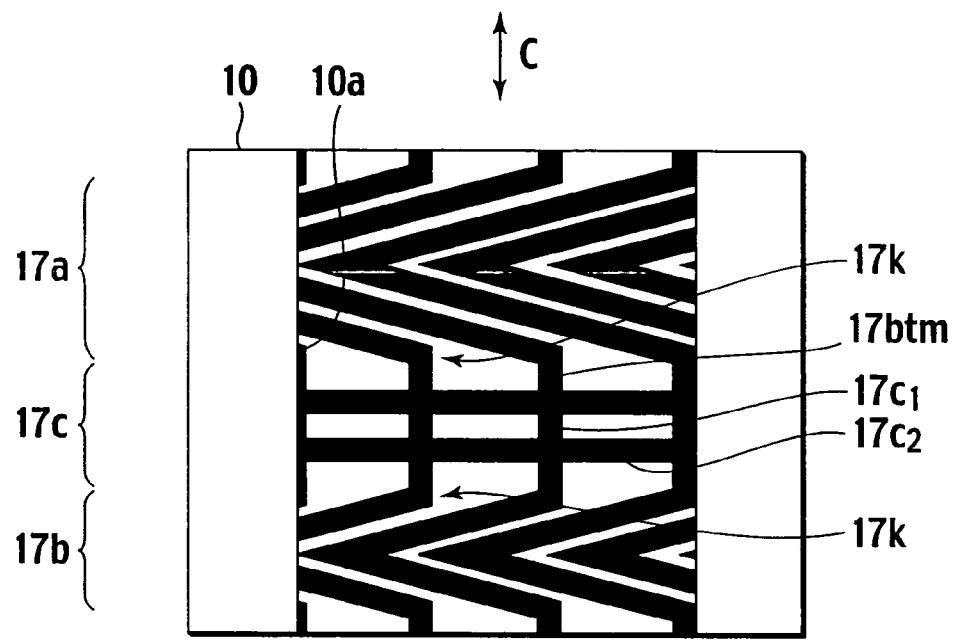
FIG. 4 illustrates a sintered alloy dynamic pressure bearing according to one embodiment of the present invention.

As illustrated in FIG. 4, there is formed a pair of radial dynamic pressure grooves 17 positioned apart from each other in a direction of an axis C in the inner circumferential surface 10a of the sleeve 10 in order to generate radial direction dynamic pressure. Specifically, there is formed a first dynamic pressure groove 17a and a second dynamic pressure groove 17b, both of which are separated apart in the C axis direction, leaving a mid-portion intervened therebetween. The first and the second grooves 17a, 17b each are composed of a plurality of grooves laid out into a so-called herringbone pattern.

Figure 3:
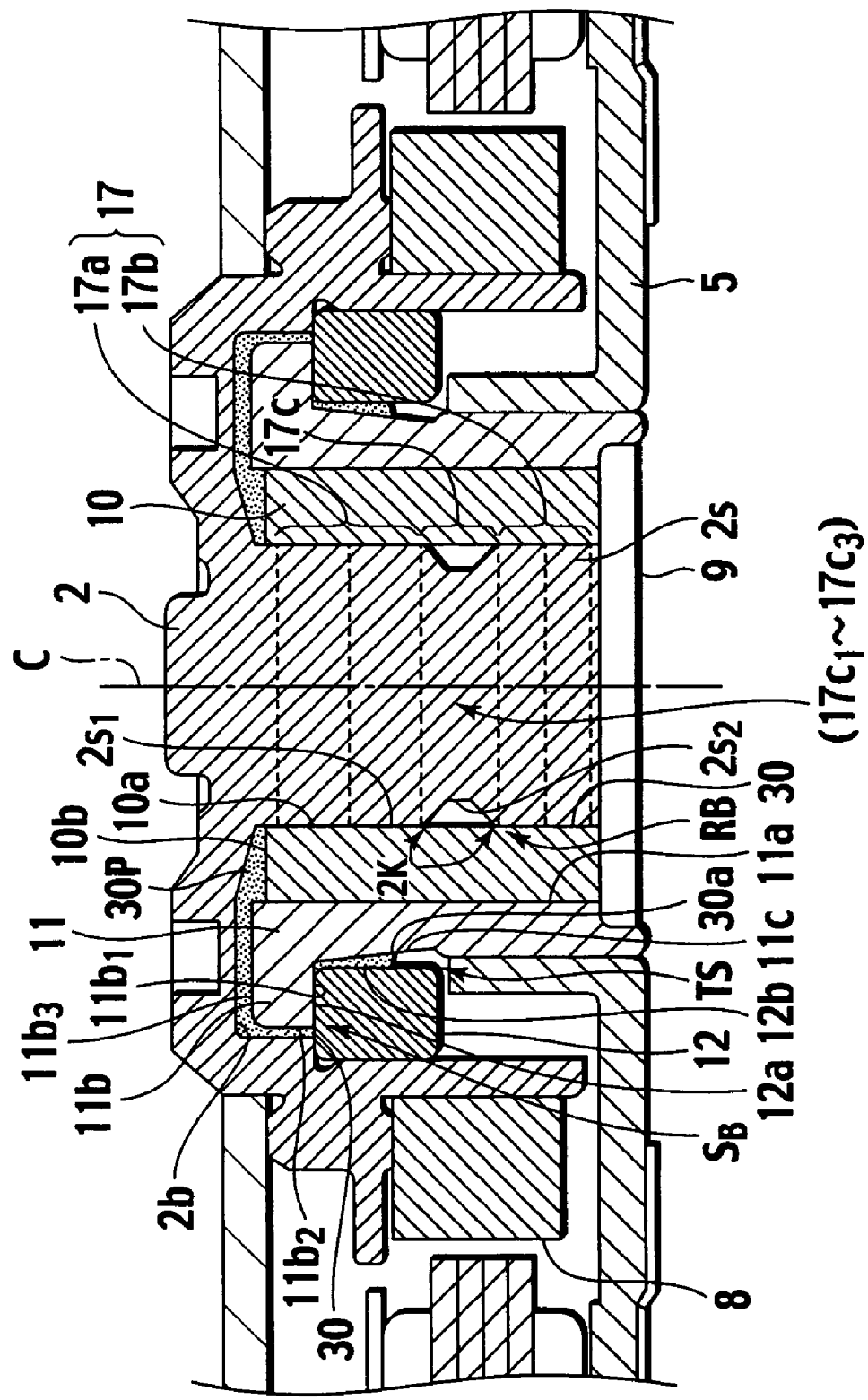
FIG. 3 is a partially enlarged cross-sectional view of the motor according to the embodiment of the present invention.

By the way, FIG. 3 only illustrates a limited portion of the first and the second dynamic pressure grooves 17a, 17b. Additionally, FIG. 4 illustrates the herringbone grooves formed in the inner circumferential surface of the sleeve 10 two-dimensionally for the sake of simplicity.

As illustrated, there is formed an additional groove in the mid-portion 17c about which will be described in detail later.

In the shaft portion 2s, a portion opposing the mid-portion 17c of the sleeve 10 has a smaller diameter than other portion thereof. This portion is referred to as a small diameter portion 2s2, hereinafter. The small diameter portion 2s2 serves to prevent bearing loss caused by viscous resistance of the lubrication oil 30 when the rotor R is rotating, because the small diameter portion 2s2 widens a gap between the inner circumferential surface 10a of the sleeve 10 and the outer circumferential surface of the shaft 2.

In addition, the small diameter portion 2s2 of the shaft portion 2s in this embodiment is formed only in a region that opposes the mid-portion 17c, which will be described in detail later.

Between the inner circumferential surface 10a of the sleeve 10 and the outer circumferential surface 2s1 of the shaft portion 2s, there is formed a micro gap in which the lubrication oil 30 is filled.

When the rotor R rotates, the radial dynamic pressure grooves 17 generate a dynamic pressure in a radial direction. As a result, the shaft portion 2s (in other words, the rotor R) can rotate leaving a predetermined gap therebetween, or without contacting the sleeve 10. The dynamic pressure groove of the radial dynamic pressure bearing portion RB will be described in detail later.

<Thrust Dynamic Pressure Bearing SB>

Next, the thrust dynamic pressure bearing portion SB will be described in detail referring to FIG. 3. The thrust dynamic pressure bearing SB is composed of a lower surface 11b1 of the flange portion 11b of the housing 11, an upper surface 12a of a thrust ring 12 opposing to the lower surface 11b1, and lubrication oil 30 existing between the two surfaces 11b1, 12a.

In the lower surface 11b1 of the flange portion 11b or the upper surface 12a of the thrust ring 12, there is formed a herringbone groove (not shown) as a thrust dynamic pressure groove.

When the rotor R rotates, the thrust dynamic pressure groove generates a dynamic pressure in a thrust direction. This pressure then forces the thrust ring 12 to be away from the flange portion 11b, in other words, the rotor R to come close to the motor base 5.

<Lubrication Oil Filled Path>

The aforementioned radial bearing portion RB and thrust bearing portion SB share the lubrication oil 30 that is filled in a lubrication oil filled portion (lubrication oil filled path) 30P.

Namely, the lubrication oil 30 is filled in the lubrication oil filled path 30P in the following way. First, the lubrication oil 30 has its own lower oil level (oil surface) 30a positioned in a taper seal portion TS defined by the inner circumferential surface 12b of the thrust ring 12 and a seal portion outer circumferential surface 11c of the sleeve 11, the surface 11c opposing the inner circumferential surface 12b. Next, the lubrication oil 30 extends therefrom through the thrust bearing portion SB; a gap between the outer circumferential surface 11b2 plus the upper surface 11b3 of the flange portion 11b and an inner lower surface 2b of the hub 2, which opposes the surfaces 11b2 and 11b3; a gap between the upper surface 10a of the sleeve 10 and the inner lower surface 2b of the hub 2; and the radial bearing RB. Then, the lubrication oil 30 reaches a gap between the counter plate 9 and the bearing 10 and finally a gap between the counter plate 9 and the lower surface of the shaft portion 2s.

The taper seal portion TS is composed of the inner circumferential surface 12b of the thrust ring 12 and the outer circumferential surface 11c of the sleeve 11. The outer circumferential surface 11c opposes the inner circumferential surface 12b of the thrust ring 12 and is inclined in relation to the inner circumferential surface 12b in such a way that the distance therebetween becomes larger toward away from the thrust bearing portion SB.

<Radial Dynamic Pressure Groove 17>

The radial dynamic pressure groove 17 having the aforementioned configuration in the redial dynamic pressure bearing portion RB will be detailed referring to FIG. 4.

FIG. 4 is a cross-sectional view of the sleeve 10, explaining the groove formed in the inner circumferential surface 10a thereof.

As illustrated, the first dynamic pressure groove 17a and the second dynamic pressure groove 17b each have a plurality of grooves laid out into the herringbone pattern in the same direction. In the mid-portion 17c formed between the dynamic pressure grooves 17a, 17b, there are provided a link groove 17c1 in the C axis direction and a perimeter groove 17c2 that intersects perpendicularly with the link groove 17c1.

Specifically, the mid-portion 17c is provided with a connection groove that is composed of the link groove 17c1 for connecting the first second dynamic pressure groove 17a with the second dynamic pressure groove 17b and the perimeter groove 17c2 that is formed perpendicularly to connect to the link groove 17c1.

By the way, the mid-portion 17c is also defined as a portion of the inner circumferential surface 10a, the portion having a height corresponding to a distance between connecting points 17k in FIG. 4. The connecting point 17k is a bent point where each groove broadening toward the right hand side in FIG. 4 in the first and the second dynamic pressure grooves 17a, 17b is connected with the associated link groove 17c1. When there exist no apparent bent points between the groove broadening toward the right hand side and the link groove 17c1 depending on a design, a point where the curvature of the connected grooves changes is considered as the connecting points.

The radial dynamic pressure groove 17 is formed by a so-called rolling method, that is a plastic deformation method in which the sleeve 10 as an object to be processed is plastically deformed by depressing a working tool thereon while shifting or rotating the sleeve 10 in relation to the working tool. For example, the grooves have a square cross-section of 0.6 mm wide and 6 micrometers deep.

Specifically, a steel component that is sufficiently smaller than the inner diameter of the sleeve 10 and has a cross-sectional shape that corresponds to the cross-section of the groove is attached on the working tool; the working tool is depressed onto the inner circumferential surface of the sleeve 10; and the sleeve 10 is shifted along the C axis direction and a rotational direction. As a result, the portion that has been subjected to depressing force is plastically deformed, resulting in the grooves.

Therefore, it is possible to inscribe stably and reproducibly the grooves having little change in the depth and width by depressing the steel member onto the inner circumferential surface of the sleeve 10 with a constant pressure, in such a way of a single stoke of the brush, if the grooves are all connected.

On the surface, or specifically the bottom surface, of the groove formed by the rolling method, the pores that make the sintered alloy porous are filled and thus an open ratio is highly reduced. Here, the open ratio (porous open ratio) is defined as an area occupied by pores in a unit area with respect to the unit area.

Figure 6:
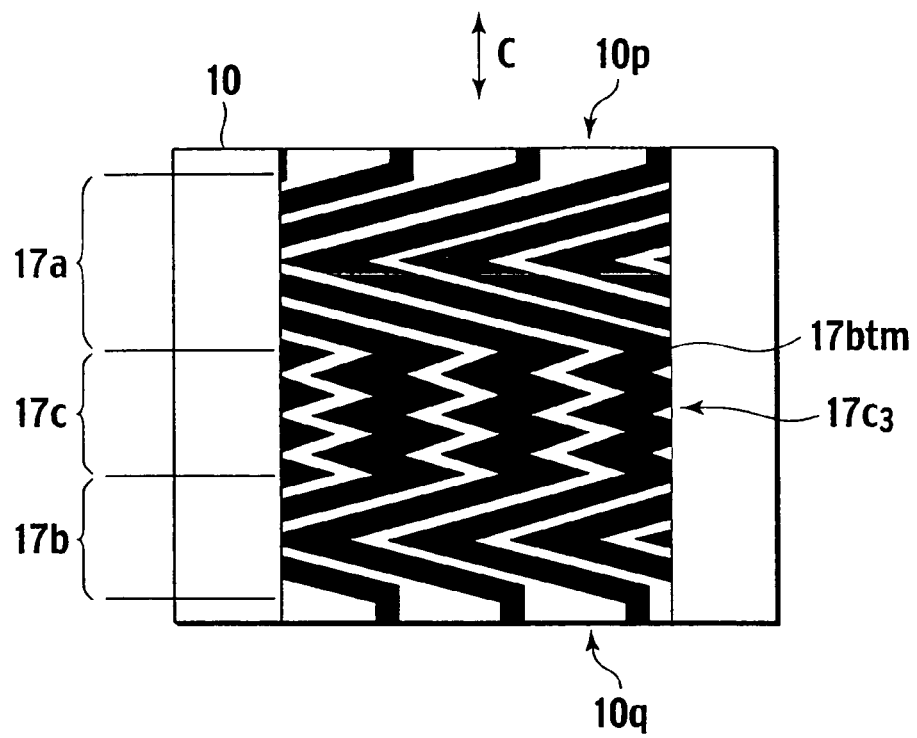
FIG. 6 illustrates a second modification of the sintered alloy dynamic pressure bearing according to the embodiment of the present invention.
Figure 7:
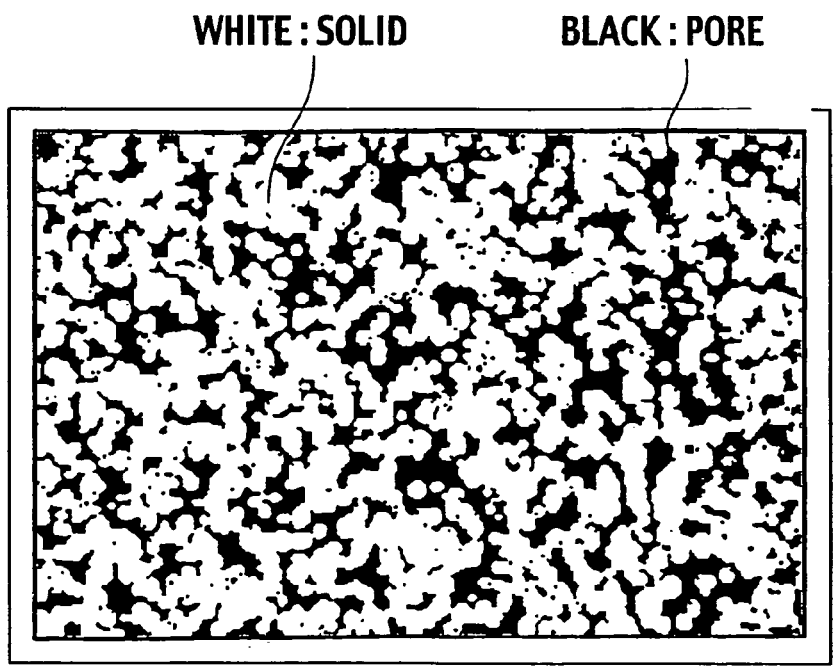
FIG. 7 illustrates a surface morphology of a sintered alloy before a groove is plastically formed therein.

A surface morphology of the sleeve 10 made of the sintered alloy material before carrying out a rolling method is shown in FIG. 6, which is an enlarged view of an area of 0.4 mm×0.3 mm. In the figure, the white area indicates a solid portion and the black area indicates pores of the porous material that constitutes the sleeve 10. Image processing based on the view reveals an open ratio of about 45%.

Figure 8:
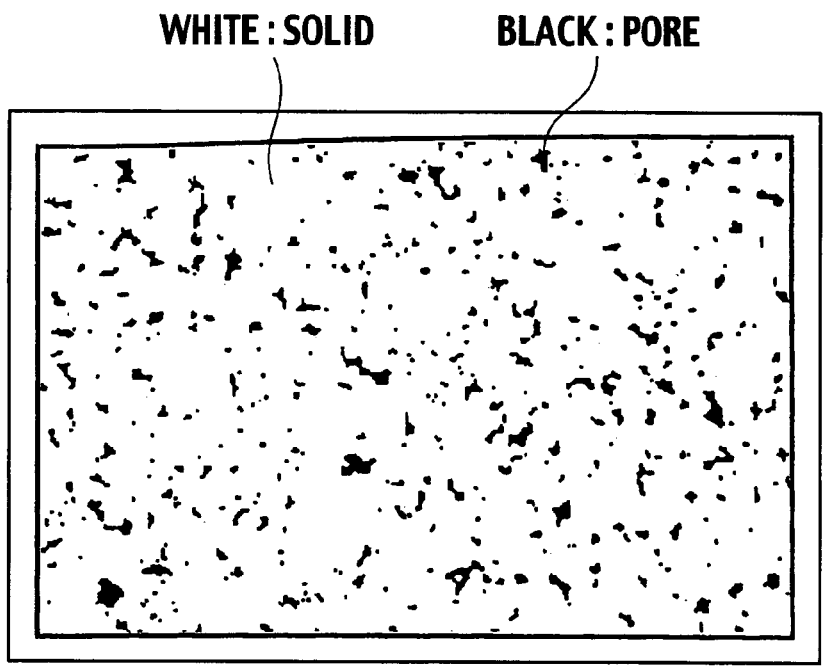
FIG. 8 illustrates a surface morphology of a bottom surface of a sintered alloy after a groove is plastically formed therein.

On the other hand, the surface morphology of the sleeve 10 after a groove of 0.6 mm wide and 6 micrometer deep has been made by the rolling method is shown in FIG. 8, which is also an enlarged view of an area of 0.4 mm×0.3 mm. Also in FIG. 8, the white area indicates a solid portion and the black area indicates pores of the porous material that constitutes the sleeve 10. Image processing based on this view reveals an open ratio of as low as about 5.0%.

Since the groove 17c1 having a low open ratio at the bottom surface 17btm (See FIG. 4) thereof is formed in the mid-portion 17c by plastic deforming as stated above, a flow of the lubrication oil in and out the porous material is strictly restrained compared with where such a groove is not formed.

Namely, the lubrication oil 30 soaked in the sleeve 10 is not readily flowing out through the surface in the mid-portion 17c in which the groove has been formed by plastic forming. This indicates that pores that allow the lubrication oil to flow therethrough are substantively covered and as a result the lubrication oil 30 is prevented from flowing back into the sleeve 10 when the center portion (or the apex portion) of dynamic pressure grooves 17a, 17b are pressurized with the lubrication oil per se.

Next, a shaft rigidity dependence on the number of sleeves 10 was investigated by fabricating various sleeves 10 having various numbers of the periphery grooves 17c2 that had been plastically formed to have a low open ratio in the mid-portion 17c.

FIG. 8 illustrates the results, that is, a relation between a mid-portion groove ratio "α" and the rigidity, where the mid-portion groove ratio "α" represents a ratio of an apparent area of the link groove 17c1 and the periphery groove 17c2 (specifically an effective area measured on the inner circumferential surface, not an area two-dimensionally illustrated in FIG. 4) to a total area of the mid-portion 17c and where the shaft rigidity represents a ratio of force applied onto the periphery of the shaft while it is rotating to a shaft deviation caused by the force, which indicates that the bearing having a higher shaft rigidity is more preferable. By the way, the open ratio is set as 0.05 (5%).

Figure 9:
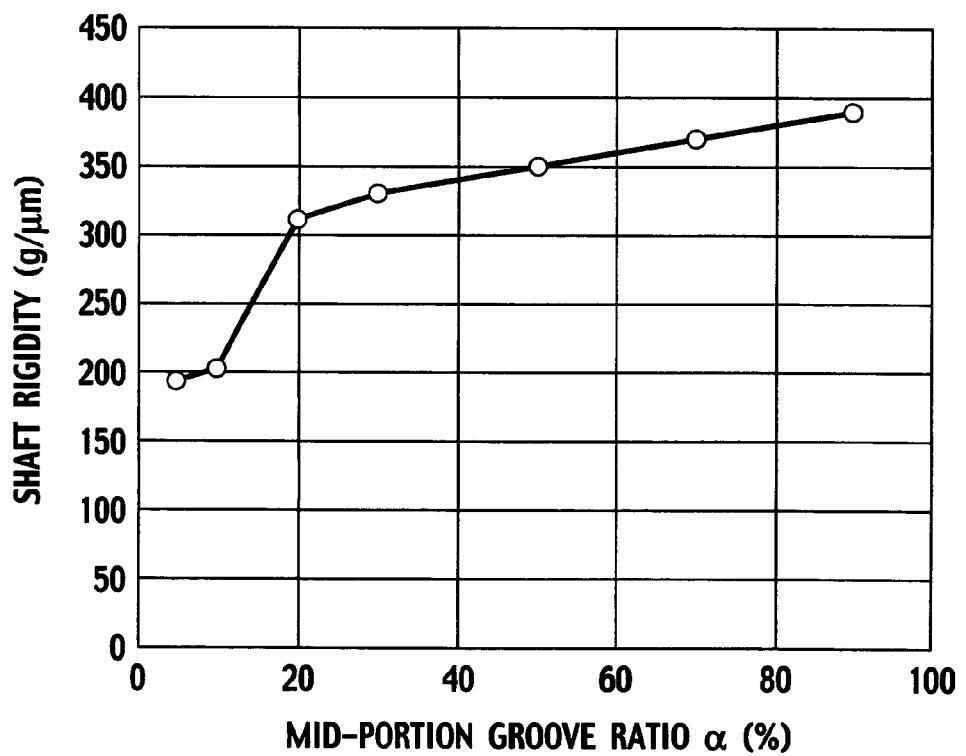
FIG. 9 illustrates a shaft rigidity characteristic of the motor according to one embodiment of the present invention.
Figure 10:
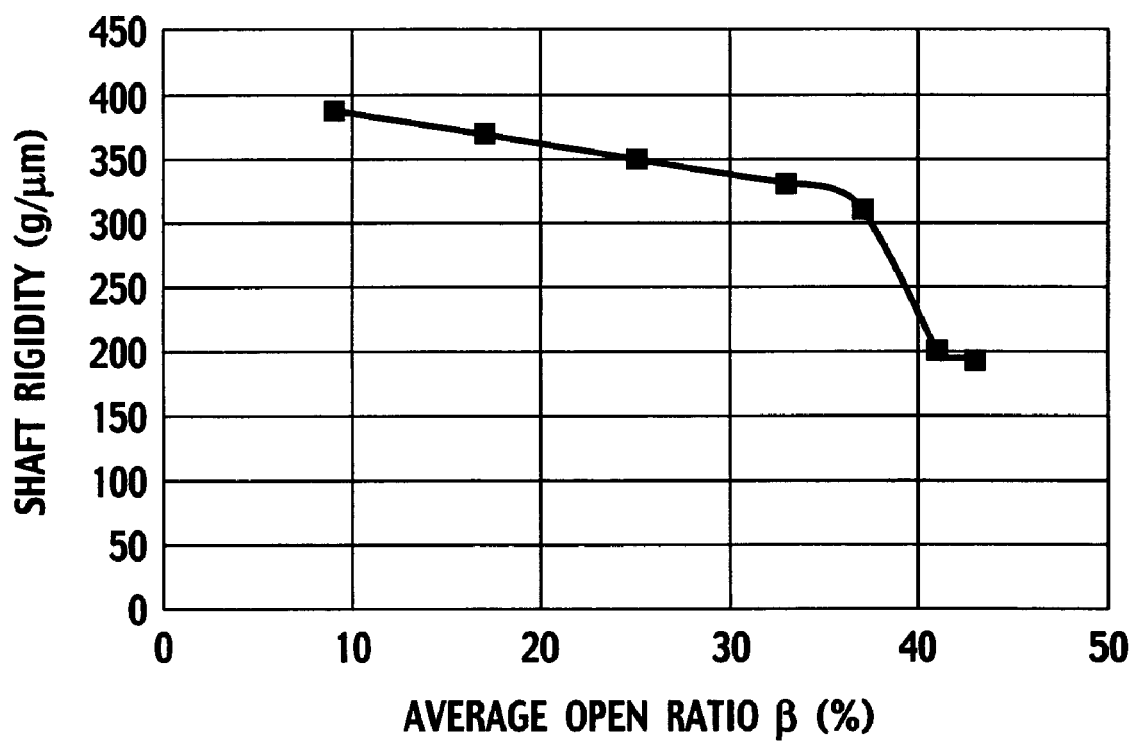
FIG. 10 illustrates another shaft rigidity characteristic of the motor according to the embodiment of the present invention.

From FIG. 9, it can be seen that whereas the shaft rigidity is about 200 g/mm when the mid-portion groove ratio "α" is less than 10%, the shaft rigidity increases abruptly up to about 300 g/mm when the mid-portion groove ratio "α" becomes 20% and increases though slightly as "α" increases in a range of over 20%. Therefore, when the mid-portion groove ratio "α" is set as 20%, an extremely high shaft rigidity is obtained. In addition, it is derivable from the result in FIG. 8 that the highest shaft rigidity can be obtained, if "α" is 100%, which indicates that the entire surface of the mid-portion 17c is plastically deformed to be a single groove.

In the above, the relation between the mid-portion groove ratio "α" and the shaft rigidity is explained with reference to FIG. 8 while setting the open ratio as 0.05 (5%). The relation is, in other words, a relation indicating that an amount of the lubrication oil that flows into the sleeve 10 is determined based on how reduced the open ratio in the mid-portion 17c is by forming the grooves and as a result the shaft rigidity is obtained in accordance with the amount. Therefore, even when the open ratio varies from place to place in the mid-portion, it is assumed that the shaft rigidity can be obtained from an average open ratio.

Consequently, the shaft rigidity can be obtained by the average open ratio "β" defined by the following expression (1). As shown in the expression, "β" is defined by an area ratio M of an apparent area of grooves in the mid-portion 17c to the total area thereof (a groove ratio M), an open ratio Mk in the bottom of the groove (a groove open ratio Mk), and an open ratio Ik in a portion except for the groove.

Average open ratio β=[groove ratio M×groove open ratio Mk+(1−groove ratio M)×open ratio Ik in a portion except for the groove]  (1)

The relation between the average open ration β and the shaft rigidity is illustrated in FIG. 9, the relation being obtained using the expression (1) and the data illustrated in FIG. 8.

Using the expression (1), for example, when the groove open ratio Mk is 1%, the shaft rigidity is obtained as follows. Namely, by substituting the groove open ratio Mk of 0.01 (1%), the groove ratio M of 0.5 (50%), and the open ratio Ik of 0.45 (45%) into the expression (1) as follows:

β=[0.5×0.01+(1−0.5)×0.45], then, the average open ratio "β" of 0.23 (23%) is obtained. Therefore, the shaft rigidity results in 355 (g/mm) from FIG. 9.

As another example, by substituting the groove open ratio Mk of 0.03 (3%), the groove ratio M of 0.7 (70%), and the open ratio Ik of 0.40 (40%) into the expression (1),

β=[0.7×0.03+(1−0.7)×0.40], then, the average open ratio "β" of 0.14 (14%) is obtained. Therefore, the shaft rigidity results in 375 (g/mm) from FIG. 9.

As yet another example, by substituting the groove open ratio Mk of 0.05 (5%), the groove ratio M of 0.5 (50%), and the open ratio Ik of 0.45 (45%) into the expression (1),

β=[0.5×0.05+(1−0.5)×0.45], then, the average open ratio "β" of 0.25 (25%) is obtained. Therefore, the shaft rigidity results in 350 (g/mm) from FIG. 9.

As apparent from FIG. 9, whereas the shaft rigidity is as low as about 200 g/mm when the average open ratio "β" is 41% or more, it increases abruptly up to about 310 (g/mm) when the "β" reduces down to 37% and increases slightly as the "β" reduces in a "β" range of 37% or less. Namely, an extremely high shaft rigidity is obtained by setting "β" as 37% or less.

In addition, it is derivable from FIG. 9 that the sleeve is preferably made of a material having a low open ratio Ik and the grooves are preferably formed by plastic forming in order to reduce the average open ratio "β". The open ratio in a portion except for the grooves (open ratio Ik) is an open ratio inherent to a sintered material per se used to make the sleeve and the sintered material having an Ik of 30% to 50% is usually used to make an oil retaining bearing.

The groove pattern formed in the mid-portion 17c is not limited to ones described in the above embodiments but modifiable as follows.

<A First Modification>

Figure 5:
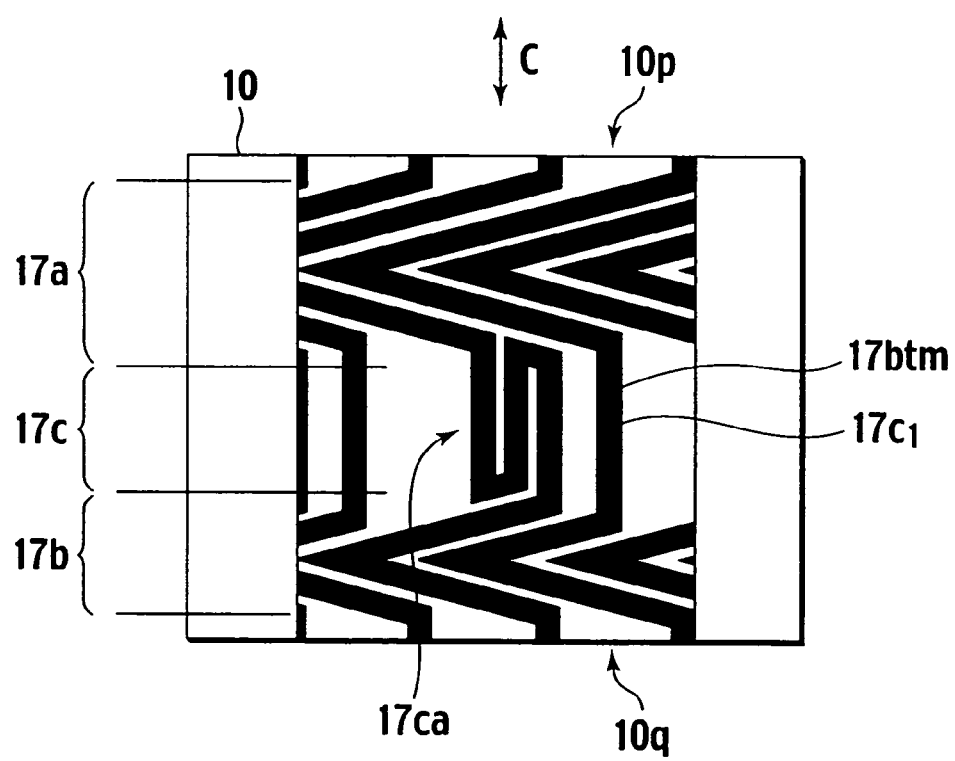
FIG. 5 illustrates a first modification of the sintered alloy dynamic pressure bearing according to the embodiment of the present invention.

FIG. 5 illustrates a first modification of the groove pattern. As shown, this groove pattern is characterized by the link groove 17c1 configured so as to link the first dynamic pressure groove 17a and the second dynamic pressure groove 17b, and a turnaround portion 17ca provided in some of the link grooves 17c1. The turnaround portion 17ca is provided in an appropriate position in such a way that the mid-portion groove ratio "α" becomes 20% or more.

In a groove forming process, a groove extending along the C axis direction is formed and then a groove extending perpendicular to the axis C is formed, and vice versa, which means there must be a predetermined number of interruptions between processing along the axis C and processing perpendicular to the axis C. The first modification makes it possible to form the grooves in a fewer number of interruptions, thereby shortening a processing time.

Specifically, the processing is as follows. Firstly, a working tool moves from one end of an opening portion 10p to the other end of an opening portion 10q to form the first dynamic pressure groove 17a. Next, when the link groove 17c1 is formed, the working tool shifts straight toward the other end of the opening portion 10q and forms the second dynamic pressure groove 17b. When the turnaround portion 17ca is formed, the working tool stops right before a region where the second dynamic pressure groove 17b is to be formed and after the sleeve rotates slightly the working tool forms the turnaround portion 17ca while moving toward the opening portion 10p. Then, the working tool stops again right before forming the first dynamic pressure groove 17a and starts moving toward the opening portion 10q to form the dynamic pressure groove 17a. After this is repeated, the second dynamic pressure groove 17b is completed.

FIG. 5 illustrates an example of the groove that is formed by performing such a turnaround of one round and half. However, the number of turnaround movements is not limited to this as far as the groove open ratio is 0.05 and the mid-portion groove ratio "α" is 20% or more, or as far as the average open ratio "β" is 37% or less.

<A Second Modification>

FIG. 6 illustrates a second modification. The groove pattern in this modification is characterized by a link groove 17c3 having short grooves bent in a zigzag manner at substantially the same angle as the herringbone groove at the first and the second dynamic pressure grooves 17a, 17b in the mid-portion 17c, instead of the link groove 17c1. Even in this modification, the groove open ratio is 0.05 and the mid-portion groove ratio "α" is 20% or more, or the average open ratio "β" is 37% or less.

Since it is difficult to generate a high dynamic pressure in the link groove 17c3 in such a pattern according to the second modification, resistance in lubrication oil at the time of rotation can be kept lower.

<A Third Modification>

In the above embodiments and the modifications, the small diameter portion 2s2 of the shaft portion 2s extends only in a region opposing the mid-portion 17c. However, the small diameter portion 2s2 can extend longer than the height of the mid-portion 17c along the shaft. This is measures to be taken considering production fluctuations or the like in order to prevent an increase in shaft loss that takes place when the mid-portion 17c overlaps part of the shaft portion 2s having a normal diameter adjacent to the small diameter portion 2s2.

In this case, the mid-portion 17c in which the mid-portion groove ratio "α" and the average open ratio "β" matter is defined as not a portion where the herringbone groove is formed but a region opposing the small diameter portion of the shaft portion 2s2 which is defined as a region between transition points 2k (FIG. 4) in which the shaft portion 2 changes its diameter from the normal one to the smaller one.

In the above embodiments and the modifications, since the mid-portion 17c of the sleeve 10 which is practically a sintered alloy dynamic pressure bearing that is provided with the radial dynamic pressure bearing portion RB has grooves in such a way that an area of the grooves amounts to 20% of the total area of the mid-portion 17c and the groove open ratio "α" is 0.05, or the average open ratio "β" is 37% or less, the shaft rigidity is elevated compared with where the grooves are not formed, thereby obtaining a durable and highly reliable sintered alloy dynamic pressure bearing.

In addition, since a motor using such a sintered alloy dynamic pressure bearing has a high shaft rigidity, this apparatus will have a low probability of occurrence of read/write errors caused by force applied from outside when the motor is employed in a disc read/write apparatus.

Moreover, since the first and the second groove 17a, 17b and the connection grooves 17c1, 17c2, 17c3 can be processed continuously, any complicated working tools are not required in production, thereby simplifying production procedures. Thus, production costs are reduced to a greater extent.

As detailed above, according to the present invention, the connection groove for linking a pair of dynamic pressure grooves 17a, 17b is formed in the mid-portion 17c or the region opposing the small diameter portion 2s2 of the shaft 2 in such a way that the open ratio is lower at the bottom of the connection groove than in other places in the sleeve 10, the pair of dynamic pressure grooves 17a, 17b being formed outside of the mid-portion 17c or the region opposing the small diameter portion 2s2.

Such a lower open ratio is realized by plastically deforming the surface of the sintered alloy material when forming the grooves. It is needless to say that press-forming, which applies pressure onto the porous material to form dynamic pressure grooves, or etching method cannot realize such a lower open ratio.

By providing such a connection groove, the average open ratio can be reduced in the mid-portion 17c or the region opposing the small diameter portion 2s2 of the shaft 2, in the sleeve 10. Therefore, higher shaft rigidity is obtained compared with where no grooves are provided.

The present invention is not limited to the representative embodiments and modifications shown and described herein, but other various modifications or alterations may be made without departing from the spirit and scope of the general inventive concept as defined by the appended claims and their equivalents.

For example, a cross-sectional shape of the radial dynamic pressure groove 17 can be an arc having a width of 0.6 mm and the maximum depth of 6 mm. When the groove 17 has such an arc cross-section, the arc-shape surface is considered as comparable to the bottom surface of the groove. In addition, when the groove has a plane side wall that is substantially perpendicular to the surface, a portion except for the side wall is considered as comparable to the bottom surface.

What is claimed is:

1. A dynamic pressure bearing formed of a porous material into a shape of a cylindrical sleeve, for rotatably supporting a shaft inserted thereinto, comprising:
    a first groove portion being formed circumferentially in a part of the inner circumferential surface of said dynamic pressure bearing;
    a second groove portion being formed circumferentially in the inner circumferential surface so as to have an intervening portion on the inner circumferential surface interposed between said first groove portion and said second groove portion; and
    a connection groove being formed in said intervening portion so as to link said first groove portion and said second groove portion, said connection groove having at a bottom surface thereof a porous open ratio lower than a porous open ratio at any portion except for the bottom surface in said intervening portion.

2. A motor comprising:
    a stator;
    a rotor including a shaft having in part a small diameter portion;
    a dynamic pressure bearing formed of a porous material into a shape of a cylindrical sleeve, said dynamic pressure bearing supporting said shaft inserted thereinto rotatably in relation to said stator;
    a first groove portion being formed circumferentially in the inner circumferential surface of said dynamic pressure bearing;
    a second groove portion being formed circumferentially in the inner circumferential surface of said dynamic pressure bearing, said second groove portion being apart from said first groove portion in an axial direction of said shaft; and
    a connection groove being formed in an intervening portion on the inner circumferential surface between said first groove portion and said second groove portion so as to link said first groove portion and said second groove portion, said connection groove having at a bottom surface thereof a porous open ratio lower than a porous open ratio at any portion except for the bottom surface.

3. A motor as recited in claim 2, wherein an average open ratio $\beta$ defined as $[M \times Mk+(1-M) \times Ik]$ is 0.37 or less, where
    M is a ratio of an area of said connection groove with respect to the total area of said circumferential region,
    Mk is a porous open ratio in said porous material at the bottom surface of said connection groove with respect to the total area of the bottom surface, and
    Ik is a porous open ratio at any portion except for the bottom surface in said circumferential region with respect to the total area of said circumferential region.

* * * * *

UNITED STATES PATENT AND TRADEMARK OFFICE
CERTIFICATE OF CORRECTION

PATENT NO. : 7,525,226 B2  Page 1 of 1
APPLICATION NO. : 11/340461
DATED : April 28, 2009
INVENTOR(S) : Mitsuo Kodama It is certified that error appears in the above-identified patent and that said Letters Patent is hereby corrected as shown below:

Title page, item (73) Assignee:

delete "VICTOR COMPANY OF JAPAN, LIMITED,

Yokohama-shi (JP)"

and replace with

-- ALPHANA TECHNOLOGY CO., LTD.,

Shizuoka, (JP) --

Signed and Sealed this

Twentieth Day of April, 2010

David J. Kappos
*Director of the United States Patent and Trademark Office*